United States Patent Office 3,019,494
Patented Feb. 6, 1962

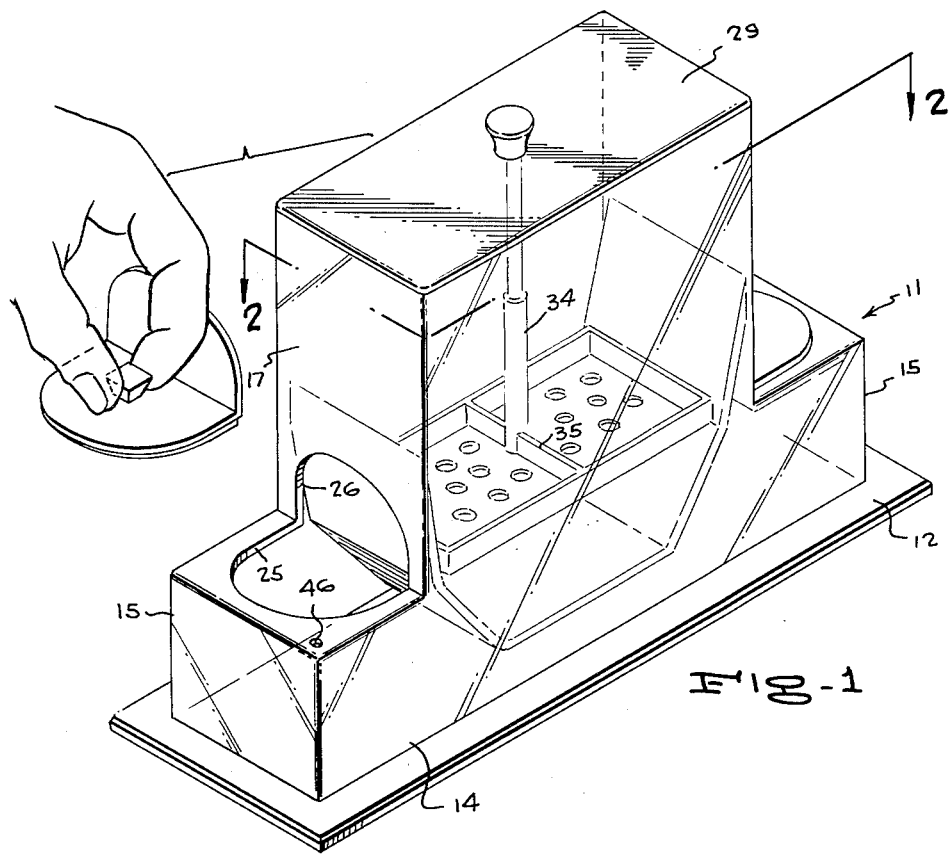
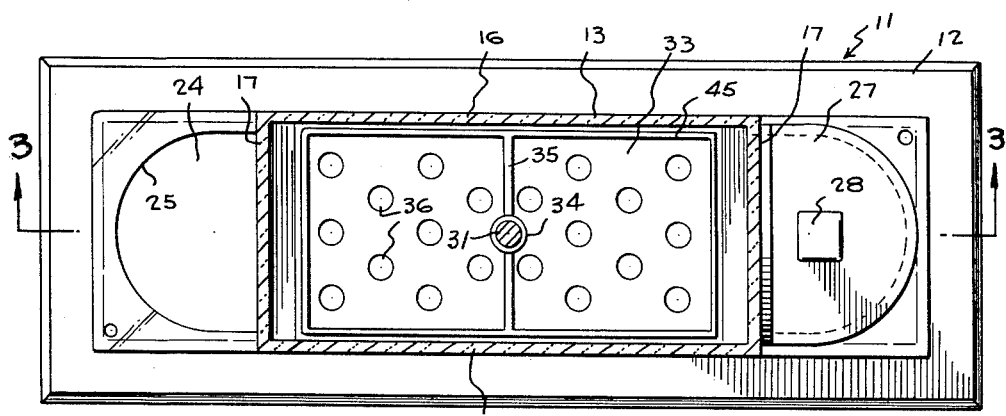

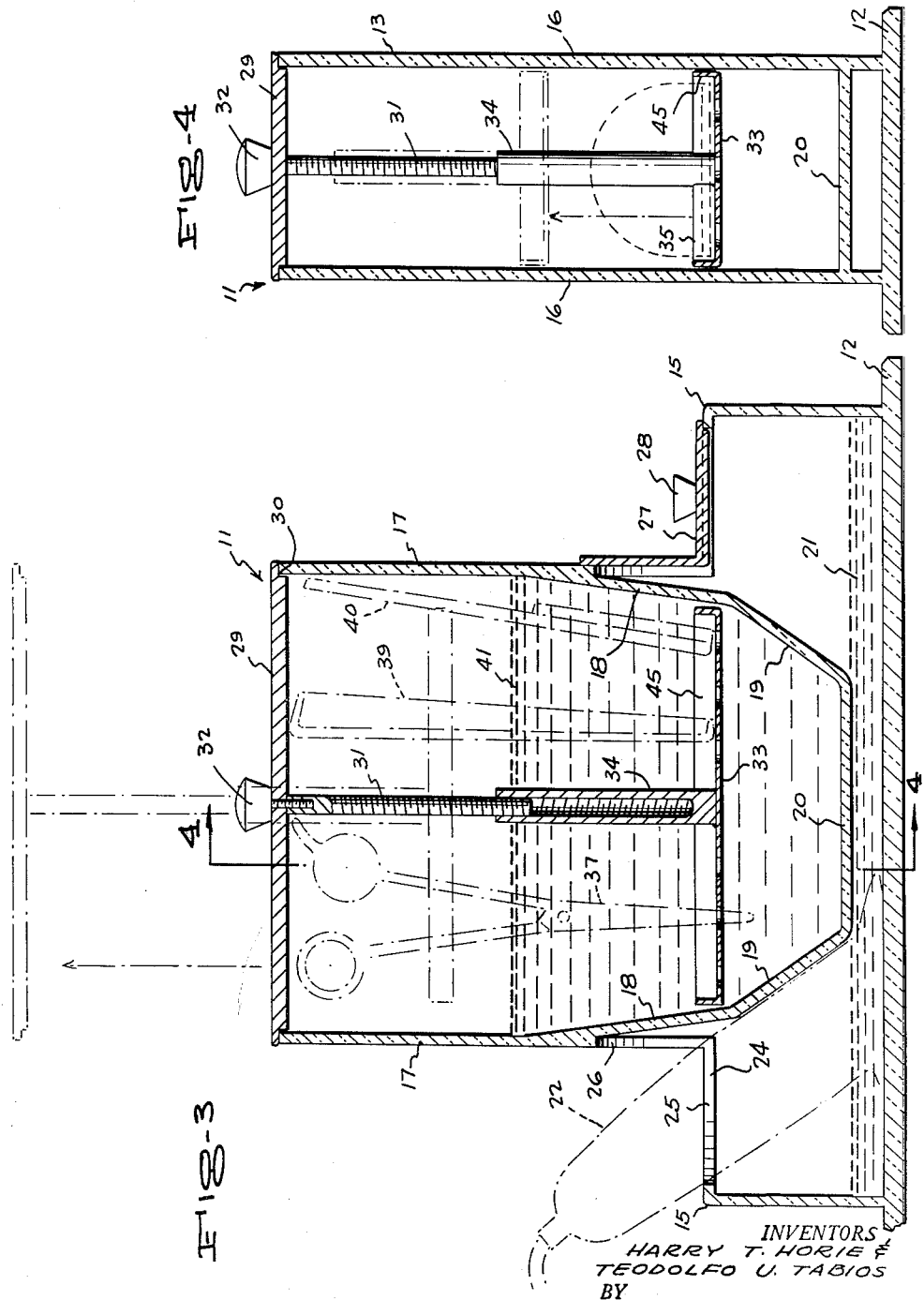

3,019,494
STERILIZER FOR BARBERS' IMPLEMENTS
Harry T. Horie, 327 Kihapai St., Honolulu, Hawaii, and Teodolfo U. Tabios, % Biltmore Barber Shop, 2424 Kalakaua Ave., Honolulu, Hawaii
Filed June 26, 1959, Ser. No. 823,111
1 Claim. (Cl. 21—87)

This invention relates to containers for barbers' implements and more particularly to a sterilizing container adapted to receive barbers' implements, such as hair clippers, scissors, combs, razors, nail clippers, nail files, and the like and to maintain the implements in a sanitary condition but in an easily accessible position.

A main object of the invention is to provide a novel and improved sterilizing container for barbers' implements, said container being simple in construction, being compact in size, and being easy to drain or clean out whenever required.

A further object of the invention is to provide an improved sterilizing container for barbers' implements, said container being inexpensive to manufacture, being durable in construction, being attractive in appearance, and being arranged so that the implements contained therein are visible through the walls of the container so that the implements are displayed and so that the container with the implements therein present a neat and clean appearance.

Further objects and advantages of the invention will become apparent from the following description and claim, and from the accompanying drawings, wherein:

FIGURE 1 is a perspective view of an improved sterilizing container for barbers' implements, constructed in accordance with the present invention FIGURE 2 is a horizontal cross sectional view taken on the line 2—2 of FIGURE 1.

FIGURE 3 is a vertical longitudinal cross sectional view taken on the line 3—3 of FIGURE 2.

FIGURE 4 is a transverse vertical cross sectional view taken on the line 4—4 of FIGURE 3.

Referring to the drawings, a typical embodiment of the improved sterilizing container of the present invention is designated generally at 11, the container comprising a base 12 on which is mounted a unitary body formed of any suitable material, preferably transparent plastic material, which is formed with an elongated main upstanding receptacle 13 and with an auxiliary receptacle 14 having the respective laterally projecting portions 15 and 15 which extend laterally from the lower portion of the main receptacle 13.

The elongated main receptacle or container 13 comprises the opposite longitudinal vertical walls 16, 16 and the opposite vertical end walls 17, 17, the lower portion of the container being provided with the downwardly and inwardly inclined transverse wall portions 18, 18 and the further downwardly and inwardly inclined transverse wall portions 19, 19 which merge with the horizontal bottom wall 20. The bottom wall 20 is spaced above the base 12, as is clearly shown in FIGURES 3 and 4 to allow communication between the respective laterally projecting auxiliary containers 15, 15. As shown in FIGURE 3, a quantity of sterilizing liquid 21 is provided in the communicating containers 15, 15, the quantity being of sufficient depth to cover the lower portion of respective hair clippers 22 which may be received in the auxiliary containers 15, 15 in the manner shown in dotted view in FIGURE 3. Thus, the auxiliary containers have top walls formed with apertures 24 through which the hair clippers 22 may be inserted, each aperture having a horizontal lower portion and a vertical upper portion, designated respectively at 25 and 26. The auxiliary containers 15, 15 are provided with removable rightangled covers 27 which are shaped to fit in the apertures 24, as illustrated for example at the right side of FIGURE 3, the horizontal portions of the covers 27 being provided with gripping knobs 28. As further shown in FIGURE 3, the sloping lowermost portions 19 of the transverse walls of the main container are angled so that the lower portion of the hair clippers may be engaged thereagainst in the manner illustrated in FIGURE 3, whereby the hair clippers will be supported in the inclined position illustrated in dotted view in FIGURE 3, being engaged against the opposite rim portion of the horizontal part 25 of the associated aperture 24.

As shown in FIGURE 2, the main receptacle 13 is of non-circular horizontal cross section, being, for example, rectangular, and is open at its top. An elongated top cover 29 fits on the top rim of the main receptacle 13, as is clearly shown in FIGURES 3 and 4.

In the specific embodiment of the invention illustrated in the drawings, the main receptacle 13 is rectangular in horizontal cross section, whereby the top cover 29 is likewise rectangular and is formed with a rightangled peripheral recess 30 adapted to receive the top rim of the main receptacle 13.

Designated at 31 is a depending threaded stud member which is secured to the intermediate portion of the top cover 29 in depending relationship thereto, as for example, being threadedly connected through the top cover to a grasping knob 32 provided on said cover.

Designated at 33 is a horizontally elongated tray member which slidably and non-rotatably fits in the main container 13, for example, being of generally rectangular shape and being adapted to depend into the lower portion of the main container, as illustrated in FIGURES 3 and 4. The tray member 33 is formed at its intermediate portion with an upstanding internally threaded sleeve 34 which threadedly receives the depending stud 31, whereby the tray member 33 is suspended from the top cover 29 by the sleeve 34 and the stud 31 engaged therein.

The tray member 33 is formed with the transverse center partition wall 35 and is further formed with a plurality of apertures 36 adapted to receive the lower ends of barbers implements, such as scissors 37, or the like. The tray member 33 is further adapted to support various other implements, such as combs 39, nail files 40, and the like, whereby to support the implements in the main container 13. A quantity of sterilizing liquid 41 is provided in the main container, the quantity of liquid being of sufficient depth to cover the lower portions of the implements supported on the tray member 33.

When it is desired to remove the implements, the cover 29 is lifted by means of the grasping knob 32, whereby the tray 33 is elevated, providing access to the implements. The cover 29 is rotatably connected with respect to the tray member since the cover member may be rotated, causing the stud 31 to rotate in the sleeve 34 with which it is threadedly engaged. This allows the cover to be rotated to a transverse position with respect to the tray member to facilitate reaching the implements supported on the tray member when the cover and tray member have been lifted, for example, to the dotted view position illustrated in FIGURE 3.

As will be readily apparent, the position of the tray 33 may be easily adjusted by rotating the cover 29, since the stud 31 may be engaged in the sleeve 34 to any desired extent, whereby to provide for any desired adjustment in height of the tray member 33 in the main container 13.

The main container 13 is preferably integrally formed with the auxiliary containers 15, 15 and the base 12, and is preferably made of a suitable transparent glass material, as above mentioned. The top cover 29 may be formed of any suitable metal, such as stainless steel, or the like, and likewise the tray 33 may be formed of suitable non-corrosive material, such as stainless steel or similar non-corrosive metal. The tray member 33 is provided with the upstanding peripheral flange 45 which acts as a retaining means to maintain the lower ends of implements supported on the tray 33 in the case where such implements are not engaged in the retaining apertures 36.

The covers 27 for the auxiliary containers 15 are preferably formed of stainless steel or similar non-corrosive metal, similar to the metal employed for top cover 29.

Because of the transparency of the sterilizer, the implements contained therein may be viewed and thus the sterilizer provides a means for displaying the implements and showing their clean condition.

The auxiliary containers 15, 15 are provided with drainage openings 46 located at corner portions of their top walls, facilitating the drainage of the auxiliary containers 15, 15 by allowing the liquid contained therein to be poured therefrom when the sterilizer is inverted. The inversion of the sterilizer also causes the main container 13 to be emptied.

Therefore, the device is easy to clean and the sterilizing liquid may be easily renewed whenever required.

While a specific embodiment of an improved sterilizer for barbers' implements has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A sterilizer for barbers' implements comprising a horizontally elongated main container of non-circular horizontal cross section and of substantial height open at its top end and having upstanding walls, said container being adapted to receive sterilizing liquid, an elongated top cover having a peripheral recess adapted to receive the top rim of said main container, an apertured elongated horizontal tray slidably and non-rotatably fitting in said main container, said tray being formed with apertures to supportingly receive portions of barbers' implements, a depending threaded stud member rigidly secured to the intermediate portion of said top cover, and an upstanding internally threaded sleeve member rigidly secured to the intermediate portion of said tray and threadedly receiving said stud member, whereby the tray may be at times elevated by lifting the top cover, whereby said top cover may be at times rotated to a transverse position with respect to said tray to provide access to said tray, and whereby the tray may be vertically adjusted by rotating said top cover.

References Cited in the file of this patent
UNITED STATES PATENTS

| | | |
|---|---|---|
| 133,791 | Mingay | Dec. 10, 1872 |
| 1,186,329 | Owen | June 6, 1916 |
| 1,842,204 | Roberts | Jan. 19, 1932 |
| 1,945,805 | Fitzgerald | Feb. 6, 1954 |